United States Patent [19]
Oppenheimer

[11] 3,763,342
[45] Oct. 2, 1973

[54] AIR COOLED MAGNETIC STRUCTURE FOR USE IN HIGH FREQUENCY WELDING AND HEATING

[75] Inventor: Edgar D. Oppenheimer, Westchester County, N.Y.

[73] Assignee: Thermatool Corp., New Rochelle, N.Y.

[22] Filed: Aug. 6, 1971

[21] Appl. No.: 169,755

[52] U.S. Cl. .................. 219/59, 219/102, 219/107, 336/61, 336/234
[51] Int. Cl. .......................................... B23k 31/06
[58] Field of Search .................. 219/8.5, 59, 64, 219/67, 101–102, 104, 107; 336/61, 234

[56] References Cited
UNITED STATES PATENTS

| | | | |
|---|---|---|---|
| 3,270,176 | 8/1966 | O'Neill et al. .................. | 219/59 X |
| 3,077,570 | 2/1963 | Popa .................................. | 336/61 |
| 3,551,863 | 12/1970 | Marton ............................ | 336/61 X |
| 2,938,993 | 5/1960 | Rudd ................................. | 219/67 |
| 3,406,271 | 10/1968 | Cachat et al. .................... | 219/59 X |
| 1,806,952 | 5/1931 | Richter ............................ | 219/102 X |

Primary Examiner—R. F. Staubly
Assistant Examiner—L. A. Schutzman
Attorney—Lorimer P. Brooks et al.

[57] ABSTRACT

A magnetic structure for use in high frequency electrical heating to restrict the width of the path of current flow. Structure is comprised of stack of substantially identical irregularly shaped laminations successively arranged in misalignment to form radiating surfaces and transversely extending passages along exterior portion of structure. Coolant is passed over said exterior portion to cool stack.

9 Claims, 5 Drawing Figures

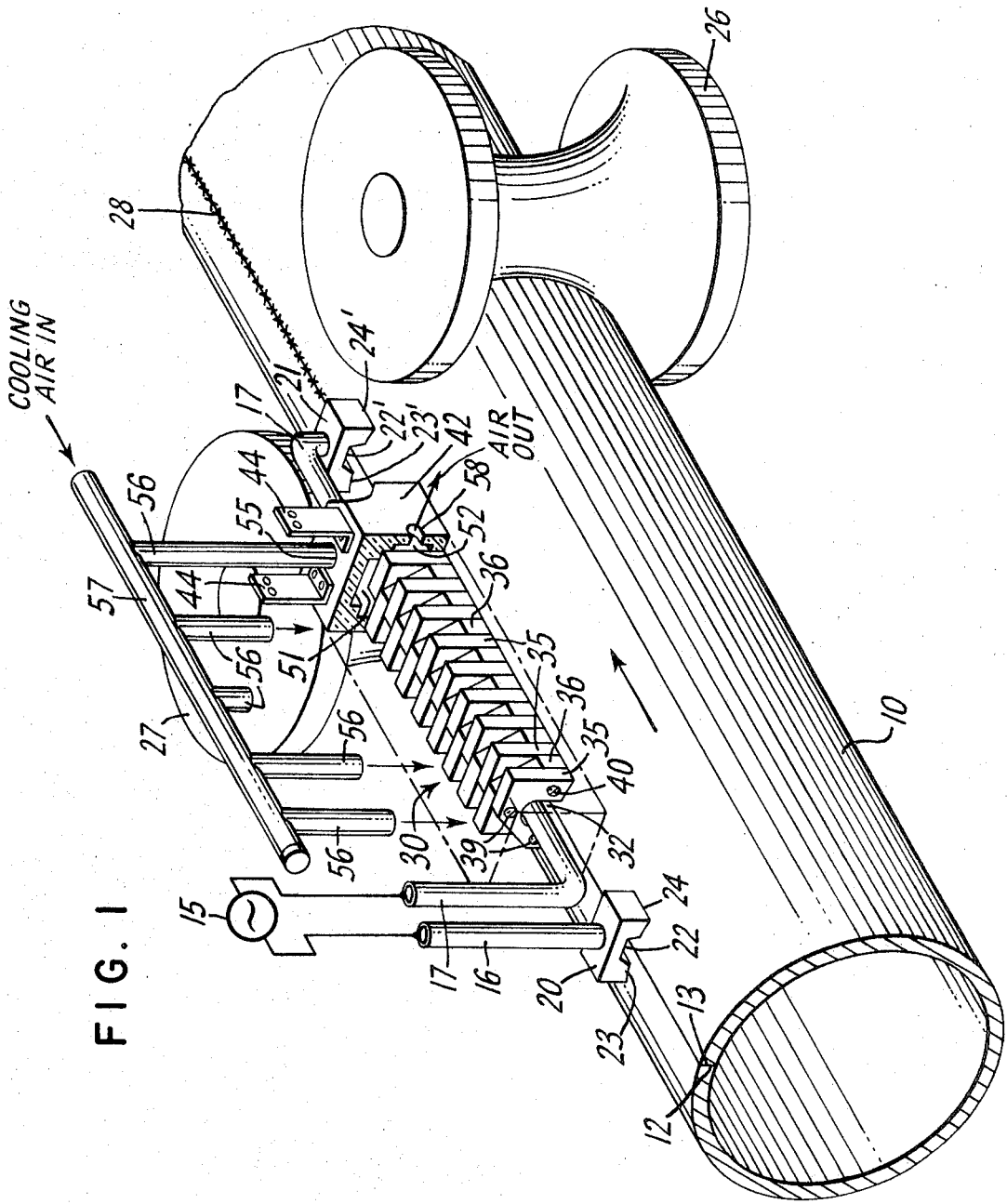

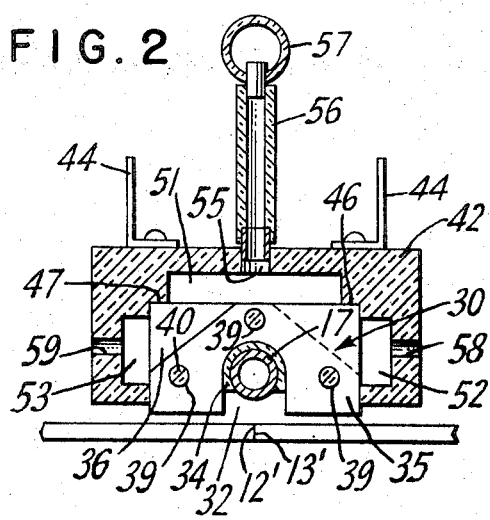
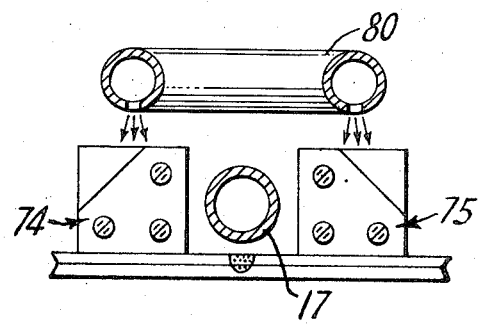
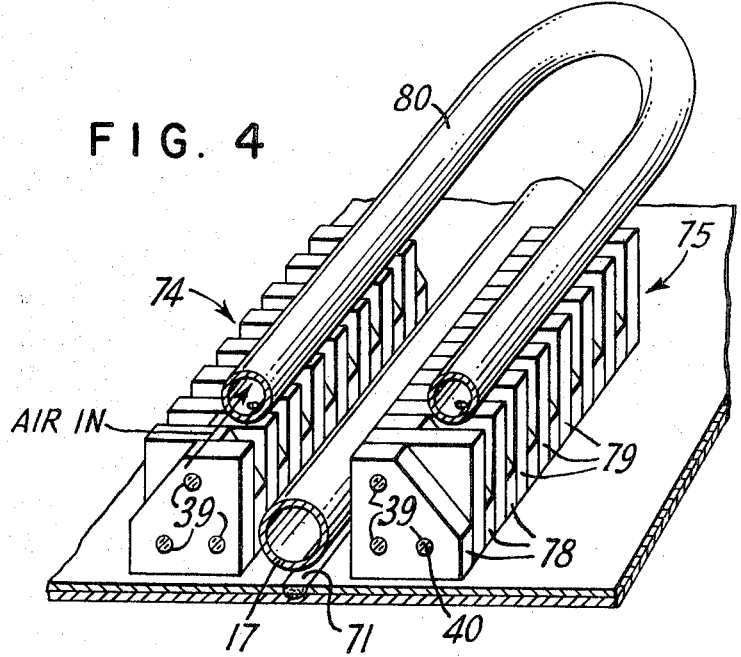
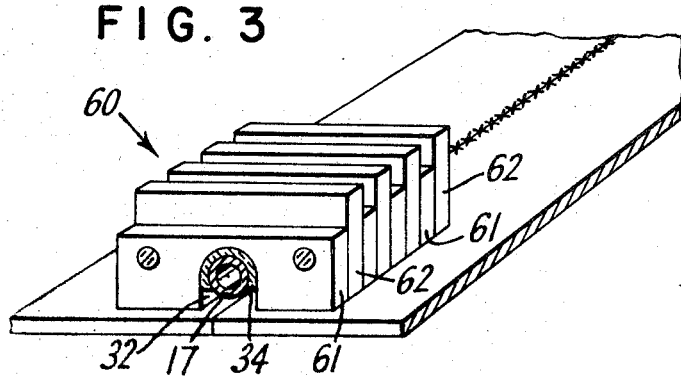

AIR COOLED MAGNETIC STRUCTURE FOR USE IN HIGH FREQUENCY WELDING AND HEATING

BACKGROUND OF THE INVENTION

In the art of high frequency electrical resistance welding and high frequency electrical annealing it is known to establish a current path along the workpiece or pieces to be heated by placing electrical contacts at spaced locations on the workpiece. To restrict the current path to a narrow region on the workpiece, thereby to improve the heating effect of the high frequency current, use is made of the well known proximity effect. This effect is established by locating one electrical conductor that is connected to one of the contacts in closely spaced and parallel relationship to the current path in the workpiece or pieces so that the flow of current in that one conductor is opposite in direction to the current flow in the workpiece. Because of the proximity effect, current in the workpiece tends to flow in a rather narrow path immediately opposite the one conductor, which commonly is called a proximity conductor.

It also is well known that the width of the high frequency current path in the workpiece can be further narrowed by placing magnetic material immediately adjacent the sides of the desired current path and around the back side of the proximity conductor. Magnetic material positioned as described provides a low reluctance magnetic flux path immediately adjacent the current path in the workpiece and in the proximity conductor. The interaction of the high frequency current and the high frequency magnetic flux surrounding the current path restricts the current flow to a vary narrow path in the workpiece.

Magnetic material to perform the function described has been used in several forms. Long solid rods of sintered ceramic-like ferrite material have been used, and elongated structures made of thin laminations of magnetic steel have been used. Because the magnetic structures are located in regions of high temperature, they often must be cooled in order to keep their operating temperatures below the Curie temperature of the material.

In a magnetic structure made from thin laminations of magnetic steel, the laminations must be electrically insulated from each other to reduce the flow of eddy currents in the structure. It is undesirable to have a metallic cooling tube pass through the structure because it is difficult to maintain electrical isolation between the laminations since the metallic cooling tube will tend to serve as a direct electrical connection between laminations. Particularly in high frequency resistance welding it has been found to be undesirable to pass a liquid coolant through or over the magnetic structure. If liquid such as water should leak from the coolant passages in the magnetic structures it may come into contact with the heated workpiece or pieces to be welded and have a detrimental effect on the quality of the weld. To physically space laminations of a magnetic structure so that a cooling fluid may be passed completely between laminations reduces the amount of magnetic material adjacent the desired current path, thus reducing the effectiveness of the material to concentrate the current.

SUMMARY OF THE INVENTION

In high frequency electrical resistance welding, a current path is established along the portion of the workpiece or pieces to be heated. A magnetic structure extends parallel to and closely adjacent the desired current path in the workpiece to restrict the width of current path, thereby to optimize the heating effect of the current. The magnetic structure is comprised of a stack of substantially identical laminations of magnetic material which have irregularly shaped peripheral regions. Successive laminations of the stack are oriented alternately in different relationships so that the irregularly shaped peripheral region of each lamination is misaligned relative to that on adjacent laminations, thereby to provide along exterior regions of the structure alternately occurring heat radiating fins and transversely extending passages. Means are provided for passing cooling air, or other fluid coolant, through the exterior regions having the alternating fins and passages.

BRIEF DESCRIPTION OF DRAWINGS

FIG. 1 is a simplified perspective view, partially broken away, illustrating a magnetic structure constructed in accordance with this invention for use in high frequency electrical resistance welding of metal tubing;

FIG. 2 is a simplified cross-sectional illustration of a magnetic structure constructed in accordance with this invention for use in the welding of flat plates; and FIGS. 3–5 are simplified illustrations of alternative embodiments of the present invention.

DESCRIPTION OF PREFERRED EMBODIMENT

In FIG. 1 a metal tube 10 to be welded is shown advancing from left to right with its unwelded edges 12 and 13 held in butting relationship by suitable means, not illustrated. High frequency electrical current from a source 15 is connected by means of leads 16 and 17 to respective electrical contacts 20 and 21 which are longitudinally spaced along the unwelded edges. Electrical contacts 20 and 21 each has a centrally recessed portion 22, 22' on its respective bottom surface which is out of contact with the metal tube 10. The transversely disposed bottom surfaces 23, 24 of contact 20, and 23', 24' of contact 21, are in electrical contact with tube 10 on opposite sides of the unwelded edges 12 and 13. High frequency electrical current from source 15 will flow through conductor 16, will divide into two parallel paths in contact 20, and will flow toward the right along the edges 12 and 13 to the surface 23' and 24' of contact 21. The current then will flow along conductor 17 back to source 15. It is seen that conductor 17 is disposed in closely adjacent but spaced relationship to the butting edges 12 and 13, and that the direction of current flow in conductor 17 is opposite to that along butting edges 12 and 13. This relationship gives rise to the proximity effect whereby the current flowing along edges 12 and 13 between contacts 20 and 21 tends to flow in a path that is restricted to the region of tube 10 immediately under proximity conductor 17. The characteristics of the current flow along the restricted path in tube 10 are a function of the frequency of the high frequency current, the magnetic and electrical properties of the material of tube 10, the temperature of the material, and the shape and location of proximity conductor 17.

In the region of electrical contact 21, edges 12 and 13 reach forge welding temperature and forging pressure is applied by means of a pair of squeeze roll 26 and 27 so that a weld seam 28 is formed to complete the tube. This particular process for welding is known in the art and will not be further described.

It should be understood that the present invention is not restricted in its use to the welding arrangement illustrated in FIG. 1. For example, at the left side of FIG. 1 the edges 12 and 13 may be slightly spaced from each other to form a V-shaped configuration with the apex of the V in the vicinity of electrical contact 21. Details of methods of welding may be found in U.S. Pats. Nos. 2,857,503 and 3,175,069. Furthermore, the magnetic structures of the present invention are not restricted in their use to tube welding. FIGS. 2 and 5 for example, illustrate the practice of the present invention in welding butting and overlapping plates which may be stationary or moving relative to electrical contacts. Further details of welding methods of the types illustrated in FIGS. 2 and 5 are illustrated and described in U.S. Pat. No. 3,591,757 by W. C. Rudd.

For optimum efficiency of the welding operation it is desired to heat only the edges 12 and 13. Proximity conductor 17 has some effect to confine the path of current flow to a narrow width, but the path can be further narrowed to the immediate region of butting edges 12 and 13 by placing the magnetic structure 30 in the position illustrated in FIG. 1. The structure is comprised of a stack of laminations of magnetic material disposed in physically contacting relationship with each other and extending longitudinally along proximity conductor 17. The laminations are made of silicon steel of a type commonly used in laminated magnetic structures. As is customary, the laminations are coated with a suitable material to electrically insulate them from each other.

Although FIGS. 1 and 2 show different workpieces being welded, the magnetic structure 30 and the apparatus associated with it are substantially identical. Therefore, the illustration of the magnetic structure 30 in FIG. 2 may be considered to be a cross sectional representation of the magnetic structure of FIG. 1.

As seen in FIGS. 1 and 2, each lamination has an inverted U-shaped void space 32 in its bottom edge to permit the passage therethrough of proximity conductor 17. A high temperature electrical insulating material 34 such as mica or Teflon is disposed between proximity conductor 17 and the magnetic structure 30. The bottom portion of each lamination is comprised of two legs 35 and 36, the bottom surfaces of which are on opposite sides of unwelded edges 12 and 13. The inside corners of the legs 35 and 36 are close to edges 12 and 13 to assure that the high frequency current that flows in the workpieces is confined to a narrow path the follows along the butting edges. Magnetic structure 30 may be slightly spaced above the surface of the workpieces to be welded or it may be in contact with them.

Because magnetic structure 30 substantially encloses the region of the workpieces which is heated to welding temperature, it might be heated above its Curie temperature and thus cease to exhibit the properties of a magnetic material unless means are provided to cool the structure.

In accordance with this invention, each lamination has a void region or irregularly shaped region, which is formed by cutting away an upper corner of the lamination. All of the laminations are identically shaped but they have been assembled in a stack with successive ones reversed in orientation with respect to its immediately adjacent laminations. All of the laminations have a plurality of apertures 39 extending therethrough and the apertures are in registration so that support means such as ceramic or glass bonded mica rods 40 may be passed through the apertures to hold the laminations in a rigid stack. Other types of support and stacking means may be used if desired.

It is seen that by assembling the laminations so that the void spaces at the upper corners of successive laminations fall on opposite sides of a vertical center plane passing through the structure, two iterative arrays of cooling fins and transverse air passages are formed along the upper exterior portion of magnetic structure 30.

To provide forced air cooling of magnetic structure 30, a ducted housing 42 is disposed about the upper part of the structure. Housing member 42 has an exterior shape of a rectangular prism and is provided with brackets 44 for supporting it and magnetic structure 30 above the surface of tube 10 or other workpiece or pieces to be heated. Housing member 42 may be made of a nonmagnetic electrical insulating material such as ceramic, epoxy, or some other high temperature plastic material. It also may be made of a nonmagnetic metal if it is electrically insulated from magnetic structure 30.

Housing 42 is secured at its interior shoulders 46 and 47 by any suitable means, such as by adhesive, to the finned upper corner regions of magnetic structure 30. As seen in FIG. 2, the interior portion of housing 42 has one top recess 51 and two oppositely located side recesses 52 and 53 which extend substantially the full length of the interior portion of the housing. Recesses 51, 52, and 53 terminate within housing 42. A plurality of apertures 55 extend through the top surface of housing 42 and communicate with recess 51. Vertically extending tubes 56 are connected at their bottom ends to respective ones of the apertures 55 and at their top ends to an air manifold 57 whose right end is connected to a source of cooling air, or other cooling fluid. The side recesses 52 and 53 also are in communication with respective pluralities of apertures 58 and 59 which are spaced along the opposite sides of housing 42.

It may be seen that cooling air that is introduced into the top recess 51 by way of manifold 57 and vertical tubes 56 will pass downwardly between the fins on both sides of magnetic structure 30 to cool the structure and then will be expelled through the apertures 58 and 59 along the sides of housing 42. Magnetic structure 30 will be substantially uniformly cooled throughout its length by the circulating air, and the temperature of structure 30 will be maintained below its Curie temperature.

Magnetic structure 30 is simple in design and relatively inexpensive to manufacture because all of the laminations are identical in shape. By assembling the laminations alternately in reverse orientation, extended heat radiating surfaces and air passages that extend transversely toward the interior portion of the structure are formed uniformly throughout the length of the structure. Another advantageous feature is that the cooling air does not come into contact with the heated edges 12 and 13.

As an alternative to introducing cooling air into upper recess 51 by way of manifold 57, vertical tubes 56, and apertures 55, said conduits and apertures may be eliminated and cooling air may be introduced at only one end of recess 51. The air then may be expelled through apertures 58 and 59 as illustrated in FIGS. 1 and 2, or it may be expelled only at the ends of recesses 52 and 53 which are opposite the end where the air is introduced into recess 51. In this alternative arrangement, recesses 51, 52, and 53 may extend to the exterior surfaces of housing 42.

FIG. 3 is an illustration of another embodiment of a magnetic structure constructed in accordance with the present invention. Magnetic structure 60 is comprised of alternating laminations 61 and 62 which have different heights. Each lamination has a void space 32 in its bottom surface to permit the passage therethrough of proximity conductor 17. A high temperature electrical insulating material 34 maintains proximity conductor 17 electrically insulated from laminations 61 and 62. Any of the types of housing members 42 described above may be utilized for passing cooling air through structure 60.

FIGS. 4 and 5 are simplified illustrations showing other embodiments of the present invention. For simplicity of illustration and description, several alternative features have been included in FIGS. 4 and 5. The workpieces to be welded are shown in fully lapped relationship, and they are to be welded together along a desired weld line 71 that extends parallel to the proximity conductor 17. The magnetic structure in this embodiment is comprised of two separate stacks of laminations 74 and 75 which are disposed parallel to and on opposite sides of proximity conductor 17. The laminations may be made of the same type of material described above. Electrical contacts for supplying high frequency heating current are not illustrated, but they would contact the upper or lower workpieces, or both, at spaced locations aligned with proximity conductor 17. One of the contacts would be connected to proximity conductor 17 to establish the required conditions that give rise to the proximity effect and the desired depth of penetration of the heating current into the workpieces.

Stack 74 on the left side of proximity conductor 17 is formed from identically shaped laminations which are similar to those illustrated in FIG. 1, with the exception that there is no void space required in the bottom surface of the laminations to permit the passage of the proximity conductor. As in magnetic structure 30 of FIG. 1, the laminations in stack 74 are arranged alternately in reverse orientation to provide the alternately occurring finned radiating surfaces and transverse air passages along the upper exterior regions of the stack.

Stack 75 on the right side of proximity conductor 17 is comprised of two sets of laminations which differ in shape. Laminations 78 have one upper corner cut away, and laminations 79 have a rectangular shape. By alternating the two differently shaped sets of laminations 78 and 79, the alternately occurring radiating fins and air passages are formed along the upper right edge of stack 75. If desired, every other lamination 78 may be reversed in orientation so that a continuous surface is not present along the upper left portion of stack 75. In both of the stacks 74 and 75, means such as rods 40 of electrical insulating material extend longitudinally through the respective laminations to maintain them in rigid stacks. Appropriate supporting means, not illustrated, support stacks 74 and 75 at their desired locations. In welding operations where heating current flows continuously in the workpieces, the magnetic structures may be located out of contact with the workpiece in order to reduce heat transfer to the structures. In instances where heating current flows only intermittently in workpieces, and thus the average heat generated over a period of time is less, the magnetic structures may contact the workpieces and serve as clamps to hold the workpieces in fixed position.

In FIGS. 4 and 5, cooling of laminated stacks 74 and 75 is provided by means of a U-shaped air conduit 80 which passes in vertically spaced relationship over the tops of both stacks 74 and 75. Conduit 80 is provided with holes along its bottom portion, FIG. 5, in order to direct cooling air onto the tops of stacks 74 and 75 to assure that the temperature of the magnetic material does not exceed its Curie temperature. Air conduit 80 may be closed at its right end, and its left end may be connected to a source of air under pressure. As in the previously described embodiments of the invention, the cooling air does not come into contact with the heated portions of the workpieces.

Other arrangements of irregularly shaped laminations and cooling arrangements will be suggested to those skilled in the art after reading the above description. For example, if very thin laminations are used, it may not be necessary to reverse the orientation of every other lamination. It may be possible that two or three adjacent laminations can be oriented in one direction and the next adjacent two or three laminations can be oriented in the reverse direction.

What is claimed is:

1. Apparatus for controlling the path of high frequency current flowing in one or more workpieces, comprising
    means connected to a source of high frequency current for establishing a high frequency current path in a portion of a surface of said one or more workpieces,
    a magnetic structure disposed closely adjacent and extending along at least a portion of the desired path of said current to control the width of the desired path,
    said structure being comprised of a plurality of laminations of magnetic material disposed in closely packed relationship and extending transversely to the direction of said path,
    all of the laminations in said structure being similarly shaped and having one peripheral region disposed closely adjacent said surface of said workpiece and said current path but spaced from said current path a distance greater than the spacing between said region and said surface,
    alternate ones of the plurality of laminations in said structure having a second peripheral region spaced from said one peripheral region in a direction away from said surface which differs in size and or shape from the closest corresponding peripheral region of a next adjacent lamination in the structure,
    said alternate ones of the laminations being distributed throughout the structure to provide alternately occurring radiating surfaces and coolant passages throughout an exterior portion of the structure, and
    means for directing a fluid coolant onto said exterior portion of the structure thereby to cool the structure.

2. The apparatus claimed in claim 1 wherein the means for directing a coolant onto said exterior portion of the structure includes a housing member positioned in closely spaced relationship to said structure, said housing having means for receiving said coolant therewithin and for passing the coolant through said radiating surfaces and coolant passages, and for expelling the coolant from the housing at one or more regions removed from said current path.

3. The apparatus claimed in claim 1 wherein the means for directing a coolant onto said exterior portion of the structure is comprised of a conduit extending in spaced parallel relationship to said exterior portion of the structure, said conduit having means for directing a fluid coolant onto said exterior portion throughout the length of the structure.

4. The apparatus claimed in claim 1 wherein the laminations of said magnetic structure are maintained in contacting relationship with each other to form a substantially rigid elongated stack.

5. The apparatus claimed in claim 4 wherein all of the laminations are asymmetrical and substantially identical in size and shape and wherein the laminations are disposed so that the second peripheral region of each lamination is differently shaped from immediately adjacent regions of the lamination, the laminations being arranged in the stack with their thickness dimensions extending substantially parallel to said current path, said alternate ones of the laminations in the structure being oriented with their second peripheral regions oppositely disposed relative to the locations of the second peripheral regions of the remainder of the laminations.

6. The apparatus claimed in claim 5 wherein the one peripheral region of each of said laminations is shaped to receive a high frequency current conductor which passes through said structure.

7. Apparatus claimed in claim 1 wherein said exterior portion of said structure is generally shaped as a rectangular prism and each lamination has at least one void space at a corner region of the rectangular prism, the void spaces on said portion of the laminations being located on one side of a central plane that extends longitudinally through said structure and the void spaces on the remainder of said laminations being located on the other side of said plane.

8. Apparatus claimed in claim 1 wherein said structure is comprised of alternately occurring laminations having different heights.

9. Apparatus claimed in claim 1 wherein said structure is comprised of two stacks of laminations disposed on opposite sides of said current path.

* * * * *